United States Patent [19]

Ohsawa et al.

[11] 3,919,645

[45] Nov. 11, 1975

[54] AM/FM RADIO RECEIVER

[75] Inventors: Mitsuo Ohsawa, Fujisawa; Yukio Onoe, Tokyo, both of Japan

[73] Assignee: Sony Corporation, Tokyo, Japan

[22] Filed: June 6, 1974

[21] Appl. No.: 477,012

[30] Foreign Application Priority Data

June 19, 1973 Japan .............................. 48-68895

[52] U.S. Cl. ................ 325/316; 325/317; 325/319; 325/363; 325/414; 329/135

[51] Int. Cl.[2] ........................................ H04B 1/06

[58] Field of Search ............................ 325/315–319, 325/363, 414; 179/15 BT; 329/1, 2, 111, 101, 103, 119, 135

[56] References Cited

UNITED STATES PATENTS

| | | | |
|---|---|---|---|
| 3,311,838 | 3/1967 | Danker | 329/135 |
| 3,525,037 | 8/1970 | Madden | 325/363 |
| 3,617,641 | 11/1971 | Fiet | 179/15 BT |
| 3,679,979 | 7/1972 | Krepps | 325/315 |
| 3,732,498 | 5/1973 | Beckman | 179/15 BT |
| 3,748,581 | 7/1973 | Yello | 325/316 |
| 3,800,226 | 3/1974 | Close | 325/315 |

*Primary Examiner*—Albert J. Mayer
*Attorney, Agent, or Firm*—Lewis H. Eslinger, Esq.; Alvin Sinderbrand, Esq.

[57] ABSTRACT

An AM/FM radio receiver has an FM input circuit and an FM amplifier connected to a rectifier circuit and has an AM input circuit and an AM intermediate frequency amplifier also connected to the same rectifier circuit. Either AM intermediate frequency signals or FM intermediate freuqency signals actuate the rectifier to produce a direct current signal, and the rectifier is connected to a tuning indicator so that the direct current signal actuates the indicator to identify correct tuning of either the AM input circuit or the FM input circuit. The rectifier is also connected to another circuit to control an automatic mono-stereo switching circuit in the FM portion of the receiver to allow stereo operation if the incoming signal has a sufficiently high amplitude. The signal from the rectifier is also connected to a muting circuit to mute the output of the FM section of the receiver in the absence of any FM signals. The output of the rectifier is also connected to a gain control circuit in the AM intermediate frequency amplifier to provide automatic gain control of the AM section of the receiver.

5 Claims, 8 Drawing Figures

AM/FM RADIO RECEIVER

BACKGROUND OF THE INVENTION

1. Field of the Invention

This invention relates to AM/FM radio receivers and particularly to a receiver that has a single rectifier circuit connected to both the AM and FM intermediate frequency amplifiers to be energized thereby and to provide a multi-purpose output signal.

2. Description of the Prior Art

Receivers that have one section capable of responding to FM signals and a second section capable of responding to AM signals are quite common. It is also common in such receivers to provide a tuning indicator, such as a tuning meter, to indicate when the receiver has been properly tuned to either an AM signal or an FM signal, depending upon which section of the receiver is energized. The tuning indicator is actuated by the FM signals by means of a first rectifier connected to the intermediate frequency (IF) amplifier of the FM section and is energized by the AM signal by means of a second rectifier circuit connected to the IF amplifier of the AM section.

In addition, in order to minimize the production of sound corresponding to undesired noise signals while tuning the receiver when it is set to receive FM signals, it is common to employ a muting circuit that prevents any sound from being produced by the speaker system of the receiver except when the FM section is tuned to an incoming signal of sufficient amplitude. The muting circuit is generally controlled by a direct voltage signal obtained from the FM discriminator or from another rectifying circuit actuated by the IF signal of the FM section. This involves the use of still another rectifier, which further complicates the circuit.

It is also common in FM receivers to provide for either monaural or stereo operation. The selection of mono mode or stereo mode may be accomplished by a further circuit that responds to a signal that corresponds to the strength of the incoming signal so that, unless the signal strength of the received FM signal is great enough, the receiver will not operate as a stereo receiver, although it can operate as a monaural receiver.

Automatic gain control (AGC) of an IF amplifier for the AM section of the receiver is quite standard, but it commonly requires a separate rectifier circuit to derive the AGC signal.

As a result of all of the rectifier and control circuits heretofore required in combined AM/FM receivers, the complexity, and therefore the cost, of such receivers has heretofore been high.

It is a principal object of the present invention to provide a combined AM/FM receiver in which a single rectifier circuit provides an output signal that can be used for a multiplicity of purposes.

A further object is to produce an AM/FM radio receiver in which a signal derived from a single rectifier circuit connected to IF amplifiers of both the AM and FM sections of the receiver can actuate a tuning indicator common to both sections, as well as a muting circuit and a mono-stereo switching control circuit for the FM section and an AGC circuit for the AM section.

A still further object of this invention is to provide an AM/FM radio receiver in which the rectifying junction between the base and emitter of a transistor is utilized to rectify output signals from the IF amplifiers of both the AM and FM sections, thereby simplifying construction of the receiver.

Further objects of the present invention will be apparent from the following description taken in conjunction with the accompanying drawings.

DESCRIPTION OF THE PREFERRED EMBODIMENT

Figure 1:
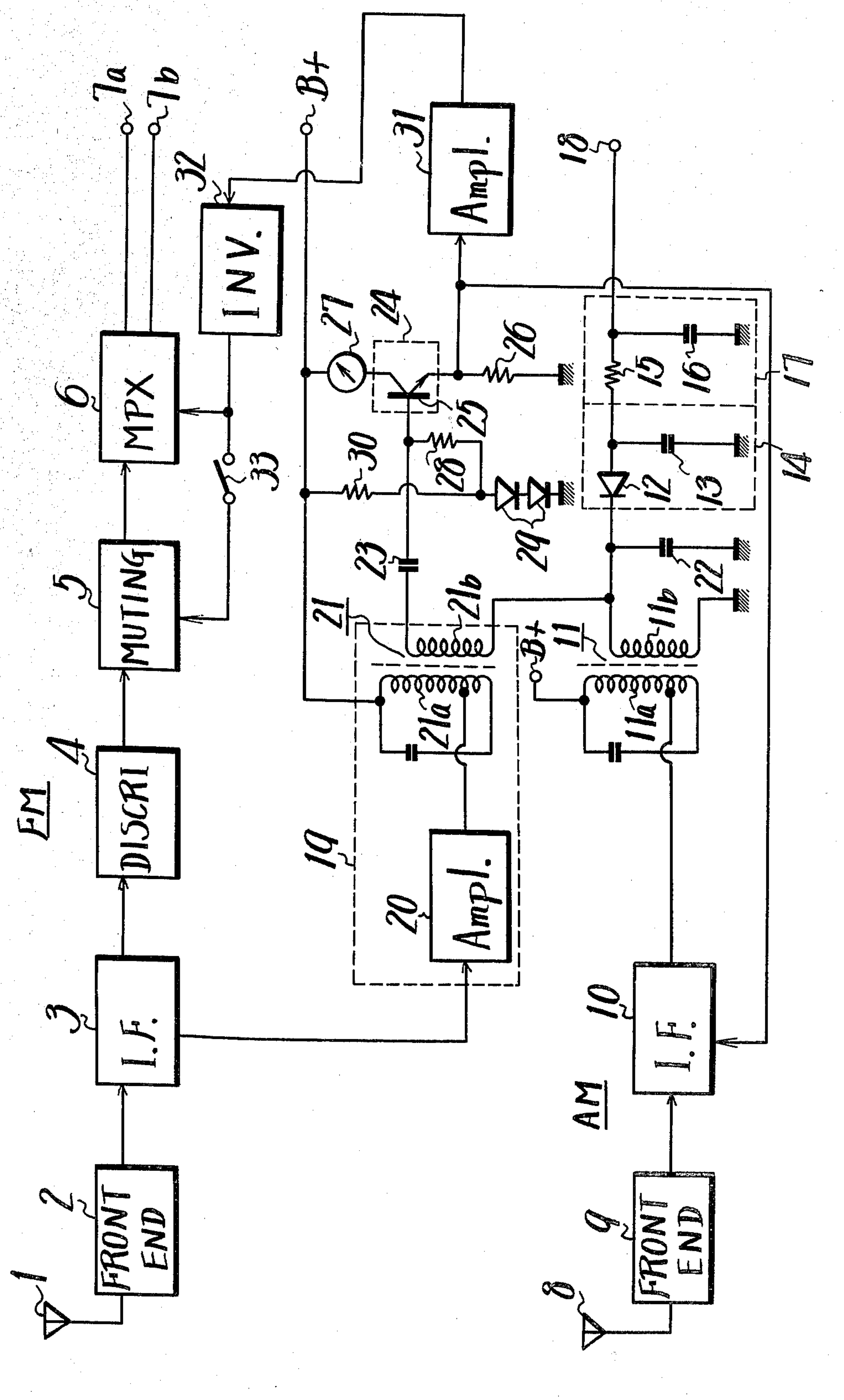
FIG. 1 is a diagram, partly in block form and partly schematic, showing part of one example of an AM/FM radio receiver connected according to the present invention.

FIG. 1 shows only those sections of a combined AM/FM receiver necessary to illustrate the present invention. Other parts of a complete receiver, for example the power supplies, audio amplifiers, etc., have no bearing on this invention and are not illustrated. Conventional circuits may be assumed for those parts.

The FM section of the receiver comprises an antenna 1 and an input circuit section that includes at least a mixer and local oscillator and usually includes a radio frequency (RF) amplifier. The components that make up the input section are identified collectively as the front end circuit 2 of the FM section. The front end circuit 2 supplies an FM intermediate frequency signal to an IF amplifier 3 which amplifies it and supplies the amplified IF signal to a discriminator 4. The output of the discriminator 4 is an audio signal which is applied to a muting circuit 5 and from there to a multiplex circuit 6. If the incoming FM signal meets the requirements for a stereo signal, the multiplex circuit 6 separates the audio signal into stereo components and applies those for the right channel to a terminal 7*a* and those for a left channel to a terminal 7*b*. Otherwise the multiplex circuit 6 supplies a monaural signal to both terminals 7*a* and 7*b*.

The AM section of the receiver comprises an antenna 8 connected to an AM front end section 9 that produces an intermediate frequency signal at the AM intermediate frequency and applies it to an AM intermediate frequency amplifier 10. The output circuit for the IF amplifier 10 comprises a coupling tank circuit 11 that has a tuned primary winding 11*a* and a secondary winding 11*b*. The secondary winding is connected to the cathode of a diode 12, the anode of which is connected by a capacitor 13 to ground. The diode and capacitor form an AM detector circuit 14. The AM signal is filtered by a resistor 15 and a capacitor 16 that form a low-pass filter 17 and is available as an audio signal at an output terminal 18.

An output signal from the IF amplifier 3 of the FM section is passed through a narrow-band amplifier circuit 19 consisting of an amplifier 20 and an output tank circuit 21 that has a tuned primary winding 21*a* and a secondary winding 21*b* connected in series with the secondary winding 11*b*. The other end of the winding 21*b* is connected by a capacitor 23 to a rectifier circuit 24 that also serves an amplifying function as well. The circuit 24 is essentially composed of an NPN-type transistor 25 that has an emitter load resistor 26 connected between its emitter and ground. A tuning meter 27 is connected between the collector of the transistor 25 and the power supply terminal B.

The capacitance values of the capacitors 22 and 23 are determined in accordance with the muting characteristics of the FM broadcast receiving section, the automatic gain control (AGC) characteristics of the AM broadcast receiving section, and the AM and FM intermediate frequencies. The capacitor 22 has a very low impedance at the 10.7 MHz FM intermediate frequency, but a relatively large impedance at the AM intermediate frequency of 455KHz.

The base of the transistor 25 is connected to ground through a series circuit that consists of a resistor 28 and one or more diodes 29. The common connection point between the resistor 28 and the diode 29 is connected by a resistor 30 to the power supply terminal B. The signal rectified by the rectifier 24 depends on which one of the two sections, the FM section or the AM section is energized. The means for energizing only one of the sections is part of the standard circuitry of the receiver. In any case, the emitter output terminal of the transistor 25 is connected to a gain control terminal of the IF amplifier 10 in the AM section and is also connected to a DC amplifier 31. The output of the DC amplifier is connected to an inverter 32, and the output of the inverter is connected to a mono-stereo switching control terminal of the stereo-multiplex circuit 6. Furthermore, an output signal from the inverter circuit 32 is connected by means of a switch 33 to a control terminal of the muting circuit 5.

Figure 2A:
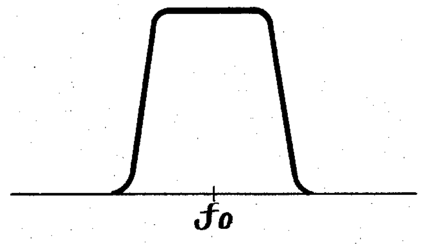
FIGS. 2A-2G are graphs illustrating frequency response of sections of the circuit in FIG. 1.
Figure 2B:
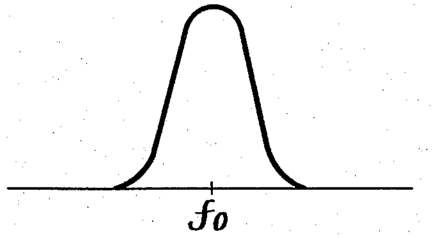

In the system described, if the FM section is to be used, it is energized, for example by applying the power supply voltage to that section and removing it from the AM section. The front end circuit 2 is then tuned until an FM signal is picked up. The FM signal passes through the IF amplifier 3 in the FM section, and its bandwidth is relatively wide, as shown in FIG. 2A. The bandwidth is reduced when the FM signal is passed through the narrow-band amplifier circuit 19, and the secondary winding 21b of the tank circuit 21 therefore has an output voltage with a more limited bandwidth having a center frequency that corresponds to the FM intermediate frequency $f_0$ of 10.7 MHz. The bandpass characteristics of the signal at the secondary winding 21*b* are shown in FIG. 2B. Since the capacitor 22 has a small impedance at the 10.7MHz frequency, the lower end of the winding 21*b* is virtually grounded and the voltage applied to the base of the transistor 25 varies in amplitude according to the closeness of tuning of the FM section to an FM signal. The impedance between the collector and emitter of the transistor 25 varies according to the voltage of its base to apply a current to the meter 27. The magnitude of this current corresponds to the tuning condition of the FM section of the receiver, and as a result the pointer of the meter indicates the tuning condition of the receiver.

Figure 2C:
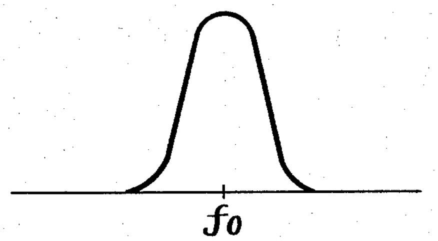
Figure 2D:
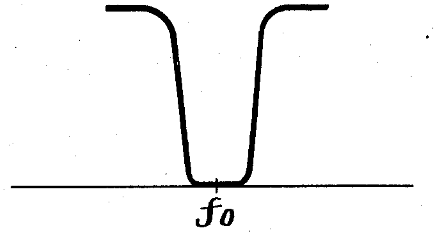
Figure 2E:
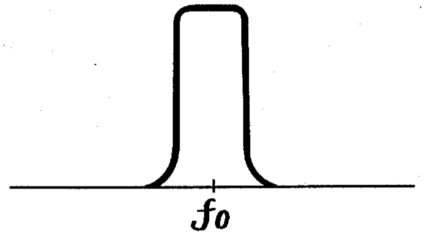

Since the transistor 25 also has a rectifying function, a direct voltage that corresponds in magnitude to the output voltage across the winding 21*b* is obtained at the emitter and varies with frequency as shown in FIG. 2C. This voltage is amplified by the amplifier 31 to produce an output signal illustrated in FIG. 2D, and this output signal is then inverted by the inverter circuit 32 to produce the signal shown in FIG. 2E. The inverted voltage shown in FIG. 2E is applied to the control terminals of the muting circuit 5 through the switch 33 and to the stereo-multiplex circuit 6 to control both of these circuits.

If the field strength of the received FM signal is great enough and if the signal is properly tuned in, the direct voltage appearing at the emitter of the transistor 25 will have a high enough level so that the output voltage of the inverter 32 will actuate the circuit 5 to allow that circuit to supply an audio signal to the multiplex circuit 6. If the signal applied to the multiplex circuit 6 is a stereo signal, the multiplex circuit will then supply right and left stereo signals to the output terminals 7*a* and 7*b*, respectively.

If the field strength of the received FM signal is not great enough to actuate the stereo-multiplex signal but is great enough to allow the muting circuit 5 to transmit an audio signal to the multiplex circuit 6, sound can still be reproduced monaurally from the output of the multiplex circuit. This means that the multiplex circuit 6 is automatically switched to the monaural mode.

If the FM section is not tuned to an incoming signal, there will be no direct voltage at the emitter of the transistor 25 and so the muting circuit 5 will not be operated and thus noise signals will not be permitted to pass through to the output terminals 7*a* and 7*b*. Muting and multiplex circuits, such as the circuits 5 and 6, capable of responding in the foregoing manner to the presence or absence of direct control voltages are already known in the receiver art and need not be described here.

Figure 2F:
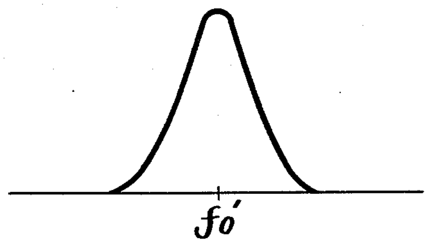

When it is desired to tune the receiver to an AM station, the AM section is placed in operative condition and the FM section is disabled. As the front end circuit 9 is tuned through a frequency band that includes an AM signal centered around a frequency $f'_0$, an output voltage corresponding to the tuning condition of the Am section is obtained across the secondary winding 11*b* of the tank circuit 11 and follows the curve shown in FIG. 2F. Since the inductance of the winding 21*b* has a small impedance at the AM intermediate frequency $f'_0$ of 455KHz, the voltage applied to the base of the transistor 25 is essentially equal to the voltage across the winding 11*b*. This causes the impedance between the collector and emitter of the transistor 25 to change in response to this applied voltage so that a direct current that corresponds to the tuning condition of the AM broadcast receiving section passes through the meter 27 and causes the pointer of the meter to indicate the tuning condition of the AM section.

Figure 2G:
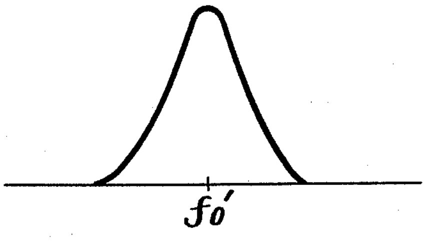

The voltage applied from the winding 11*b* to the base of the transistor also serves another purpose. The rectifying operation of the transistor 25 causes a direct voltage having a frequency response that is shown in FIG. 2G to be generated at the emitter of the transistor. This voltage is fed back to the gain control terminal of the IF amplifier 10 of the AM section to provide excellent automatic gain control. Thus it may be seen that the direct voltage derived from the emitter of the transistor 25 when the receiver is being operated as an FM receiver can be used to perform the muting and mono-stereo switching operations for the FM broadcast receiving section. When the receiver is used as an AM receiver, the voltage at the emitter of the transistor 25 can be used to provide an AGC signal for the AM broadcast receiving section. Moreover, only a single rectifier circuit 24 and tuning meter, or indicator, 27 need be supplied to indicate the tuning of either the FM section or the AM section. This tuning indication does not require a change-over switch to connect the tuning meter 27 to the FM section or the AM section, selectively.

We claim:

1. An AM/FM radio receiver for selectively reproducing audio information transmitted thereto by AM or FM transmission, comprising:

a tunable FM section for receiving an FM signal and including an FM intermediate frequency amplifier, an FM demodulator coupled to said FM intermediate frequency amplifier, and output means coupled to said FM demodulator for receiving said audio information;

a tunable AM section separate from said FM section for receiving an AM signal and including a gain controllable AM intermediate frequency amplifier, an AM demodulator coupled to said AM intermediate frequency amplifier, and output means coupled to said AM demodulator for receiving said audio information;

first coupling means coupled to said FM intermediate frequency amplifier for receiving the FM intermediate frequency signal and for coupling same to further means;

second coupling means coupled to said AM intermediate frequency amplifier for receiving the AM intermediate frequency signal and for coupling same to said further means;

portions of said first and second coupling means being connected in series with each other, the impedance of said first coupling means to said AM intermediate frequency signal being relatively low such that substantially no attenuation is imparted thereby to said AM intermediate frequency signal, and the impedance of said second coupling means to said FM intermediate frequency signal being relatively low such that substantially no attenuation is imparted thereby to said FM intermediate frequency signal;

a transistor having its base-emitter circuit connected in series with said portions of said first and second coupling means to receive said FM and AM intermediate frequency signals, the base-emitter junction of said transistor rectifying the signals applied thereto to produce a direct current having a magnitude determined by the amplitude of said applied signals;

indicating means connected to the collector of said transistor for indicating the magnitude of said produced direct current to thereby indicate the tuning condition of said receiver with respect to the received FM and AM signals; and means coupled to the emitter of said transistor and responsive to said magnitude of said produced direct current to control the gain of said AM intermediate frequency amplifier and to control the operation of said FM section output means so as to permit the stereo reproduction of a received stereo FM signal and to permit interstation muting during tuning of said FM section.

2. An AM/FM radio receiver in accordance with claim 1 wherein said FM section output means comprises a stereo-multiplex circuit having monaural/stereo switch means; a muting circuit; and means for applying said produced direct current to siad monaural/stereo switch means and to said muting circuit.

3. An AM/FM radio receiver according to claim 1 wherein each of said coupling means is comprised of a tuned circuit having primary and secondary windings, a secondary winding of each of said tuned circuits being connected in series with each other and connected to said transistor.

4. An AM/FM radio receiver according to claim 3 wherein said second coupling means further includes a capacitor connected in parallel with said secondary winding, said capacitor having a relatively low impedance with respect to FM intermediate frequency signals.

5. An AM/FM radio receiver according to claim 3 wherein said tuned circuit included in said first coupling means has a bandpass characteristic narrower than that of said FM intermediate frequency amplifier.

* * * * *